(12) United States Patent
Sundberg et al.

(10) Patent No.: US 9,227,648 B2
(45) Date of Patent: Jan. 5, 2016

(54) COMPACTIBLE STROLLER

(71) Applicant: Cosco Management, Inc., Wilmington, DE (US)

(72) Inventors: Brian C Sundberg, Chester, NH (US); Joseph D Langley, Foxboro, MA (US); Ward A Fritz, Westwood, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 14/049,667

(22) Filed: Oct. 9, 2013

(65) Prior Publication Data

US 2014/0097598 A1    Apr. 10, 2014

Related U.S. Application Data

(60) Provisional application No. 61/711,590, filed on Oct. 9, 2012.

(51) Int. Cl.
| | |
|---|---|
| *B62B 7/08* | (2006.01) |
| *B62B 7/00* | (2006.01) |
| *B62B 3/02* | (2006.01) |
| *B62B 7/12* | (2006.01) |
| *B62B 7/14* | (2006.01) |
| *B62B 9/12* | (2006.01) |
| *B62B 9/20* | (2006.01) |

(52) U.S. Cl.
CPC . *B62B 7/006* (2013.01); *B62B 3/02* (2013.01); *B62B 7/08* (2013.01); *B62B 7/12* (2013.01); *B62B 7/145* (2013.01); *B62B 9/12* (2013.01); *B62B 9/20* (2013.01)

(58) Field of Classification Search
CPC ......... B62B 3/02; B62B 9/26; B62B 5/0016; B62B 5/085; B62B 7/08; B62B 7/10; B62B 7/12; B62B 7/145; B62B 7/142; B62B 7/14
USPC ........... 280/31, 642, 643, 647, 648, 650, 657, 280/658, 47.34, 47.37, 47.31, 79.2
See application file for complete search history.

(56) References Cited

U.S. PATENT DOCUMENTS

| | | | | |
|---|---|---|---|---|
| 1,762,680 | A * | 6/1930 | Debelack | 280/31 |
| 2,170,227 | A * | 8/1939 | Weber | 280/37 |
| 2,645,502 | A * | 7/1953 | Collins et al. | 280/31 |
| 2,969,830 | A * | 1/1961 | Thompson | 297/136 |
| 4,834,404 | A * | 5/1989 | Wood | 280/33.993 |
| 4,874,182 | A * | 10/1989 | Clark | 280/30 |
| 4,989,888 | A * | 2/1991 | Qureshi et al. | 280/30 |
| 5,133,567 | A * | 7/1992 | Owens | 280/30 |
| 5,454,575 | A * | 10/1995 | Del Buono | 280/35 |

(Continued)

FOREIGN PATENT DOCUMENTS

| | | | |
|---|---|---|---|
| JP | 2005-143820 | * | 6/2005 |
| WO | 2007118088 A2 | | 10/2007 |

OTHER PUBLICATIONS

PCT International Search Report and Written Opinion completed by the ISA/US on Feb. 13, 2014 and issued in connection with PCT/US2013/064080.

*Primary Examiner* — Katy M Ebner
*Assistant Examiner* — Emma K Frick
(74) *Attorney, Agent, or Firm* — Barnes & Thornburg LLP

(57) ABSTRACT

A collapsible stroller includes a mobile base and a juvenile seat coupled to the mobile base. The mobile base includes a foldable frame and wheels.

21 Claims, 5 Drawing Sheets

(56) References Cited

U.S. PATENT DOCUMENTS

| | | | |
|---|---|---|---|
| 5,527,096 A * | 6/1996 | Shimer | 297/327 |
| 5,580,072 A * | 12/1996 | Monneret | 280/47.38 |
| 5,823,547 A * | 10/1998 | Otobe et al. | 280/30 |
| 6,446,990 B1 * | 9/2002 | Nania et al. | 280/47.371 |
| 6,582,181 B2 * | 6/2003 | Suehiro et al. | 414/812 |
| 6,612,645 B1 * | 9/2003 | Hsu | 297/195.13 |
| 6,708,992 B1 * | 3/2004 | Vargas | 280/47.38 |
| 6,966,565 B1 * | 11/2005 | Ryan et al. | 280/33.992 |
| 7,464,957 B2 * | 12/2008 | Worth et al. | 280/642 |
| 7,500,692 B2 * | 3/2009 | Espenshade | 280/647 |
| 7,543,886 B2 * | 6/2009 | Gutierrez-Hedges et al. | 297/118 |
| 7,624,954 B2 * | 12/2009 | Randle et al. | 248/129 |
| 7,658,388 B1 * | 2/2010 | Rodriguez et al. | 280/30 |
| 7,789,413 B2 * | 9/2010 | Hei et al. | 280/642 |
| 8,205,907 B2 | 6/2012 | Chicca | |
| 8,276,985 B2 * | 10/2012 | Kho et al. | 297/130 |
| 8,567,866 B2 * | 10/2013 | Carimati Di Carimate et al. | 297/378.1 |
| 8,696,016 B2 * | 4/2014 | Homan et al. | 280/647 |
| 2002/0093177 A1 * | 7/2002 | Chen | 280/647 |
| 2004/0090046 A1 * | 5/2004 | Hartenstine et al. | 280/642 |
| 2004/0173997 A1 | 9/2004 | Voll et al. | |
| 2005/0127640 A1 * | 6/2005 | Worth et al. | 280/642 |
| 2005/0140119 A1 * | 6/2005 | Wong | 280/651 |
| 2006/0284392 A1 * | 12/2006 | Chen | 280/47.38 |
| 2007/0126207 A1 * | 6/2007 | Rojas et al. | 280/647 |
| 2007/0241524 A1 * | 10/2007 | Dotsey et al. | 280/47.38 |
| 2008/0224451 A1 * | 9/2008 | Vegt | 280/642 |
| 2009/0295128 A1 * | 12/2009 | Nagelski et al. | 280/642 |
| 2010/0059970 A1 * | 3/2010 | Scott | 280/658 |
| 2011/0089670 A1 | 4/2011 | Henry et al. | |
| 2011/0175309 A1 * | 7/2011 | Newhard | 280/47.35 |
| 2013/0140797 A1 | 6/2013 | Fritz et al. | |
| 2013/0292923 A1 * | 11/2013 | Burchi | 280/647 |
| 2014/0252737 A1 * | 9/2014 | Maxie | 280/47.38 |

* cited by examiner

COMPACTIBLE STROLLER

PRIORITY CLAIM

This application claims priority under 35 U.S.C. §119(e) to U.S. Provisional Application Ser. No. 61/711,590, filed Oct. 9, 2012, which is expressly incorporated by reference herein.

BACKGROUND

The present disclosure relates to collapsible strollers for juveniles, and particularly, a mobile cart for a juvenile vehicle seat. More particularly, the present disclosure relates to a juvenile vehicle seat that can be mounted on a frame to provide a juvenile stroller.

Juvenile strollers are used widely to transport young children. Foldable strollers including collapsible frame assemblies can be placed in vehicle trunks or storage areas. Caregivers appreciate compact foldable strollers that do not require a lot of storage space so that space is available onboard a vehicle or elsewhere for storage of other items.

SUMMARY

A collapsible stroller in accordance with the present disclosure includes a rolling base and a juvenile seat coupled to the rolling base. The rolling base includes a foldable frame and wheels.

In illustrative embodiments, a rolling base in accordance with the present disclosure includes an elevated shell-support frame and pivotable front and rear pivotable wheel units. Each of the front and rear wheel units is mounted on the shell-support frame for pivotable movement between an extended position associated with an expanded use mode of the rolling base to elevate the shell-support frame above the ground and a retracted position associated with a collapsed storage mode of the rolling base to lower the shell-support frame toward the ground. In illustrative embodiments, the juvenile seat includes a seat shell configured to receive a juvenile and a handle mounted on the seat shell for extensible movement between retracted and extended positions to provide means for moving a mobile unit including the rolling base and the seat shell along ground underlying the rolling base in an expanded use mode of the rolling base after the handle has been moved relative to the seat shell to assume the extended position.

In an illustrative collapsed storage mode, the rolling base has been folded by a caregiver to cause the two wheel units to be pivoted toward one another so that they criss-cross and lie under the shell-support frame and lower the shell-support frame closer to the underlying ground. In an illustrative expanded use mode, the rolling base has been unfolded by a caregiver to cause the two wheel units to be pivoted away from one another so that the front wheel unit extends downwardly in a forward direction at an angle away from a front end of the shell-support frame and the rear wheel unit extends downwardly in a rearward direction at an angle away from a rear end of the shell-support frame.

In illustrative embodiments, an infant carrier includes a seat shell configured to receive an infant and a carry handle mounted for pivotable movement between a storage position and a carry position. The infant carrier also includes a shell mount coupled to the seat shell and configured to provide means for mounting the seat shell in a stationary (but releasable) position on the shell-support frame of the rolling base to move with the rolling base as the rolling base rolls along ground underlying the rolling base to establish a stroller mode of the infant carrier.

Also included in the infant carrier in illustrative embodiments is a stroller push handle that is mounted on the seat shell for sliding movement between a retracted storage position and an extended use position so that a caregiver can mount the infant carrier on the rolling base to establish the stroller mode of the infant carrier and extend the push handle to create a stroller. Later, the caregiver can elect to separate the infant carrier from the rolling base to establish a carrier mode of the infant carrier, retract the stroller push handle, and pivot the carry handle to its carry position. The rolling base can be folded to assume a compact storage configuration. In illustrative embodiments, a basket is configured to be mated to the rolling base to provide a rolling storage system and alternatively to be separated from the rolling base and converted into a shoulder bag when the infant carrier is separated from the rolling base.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
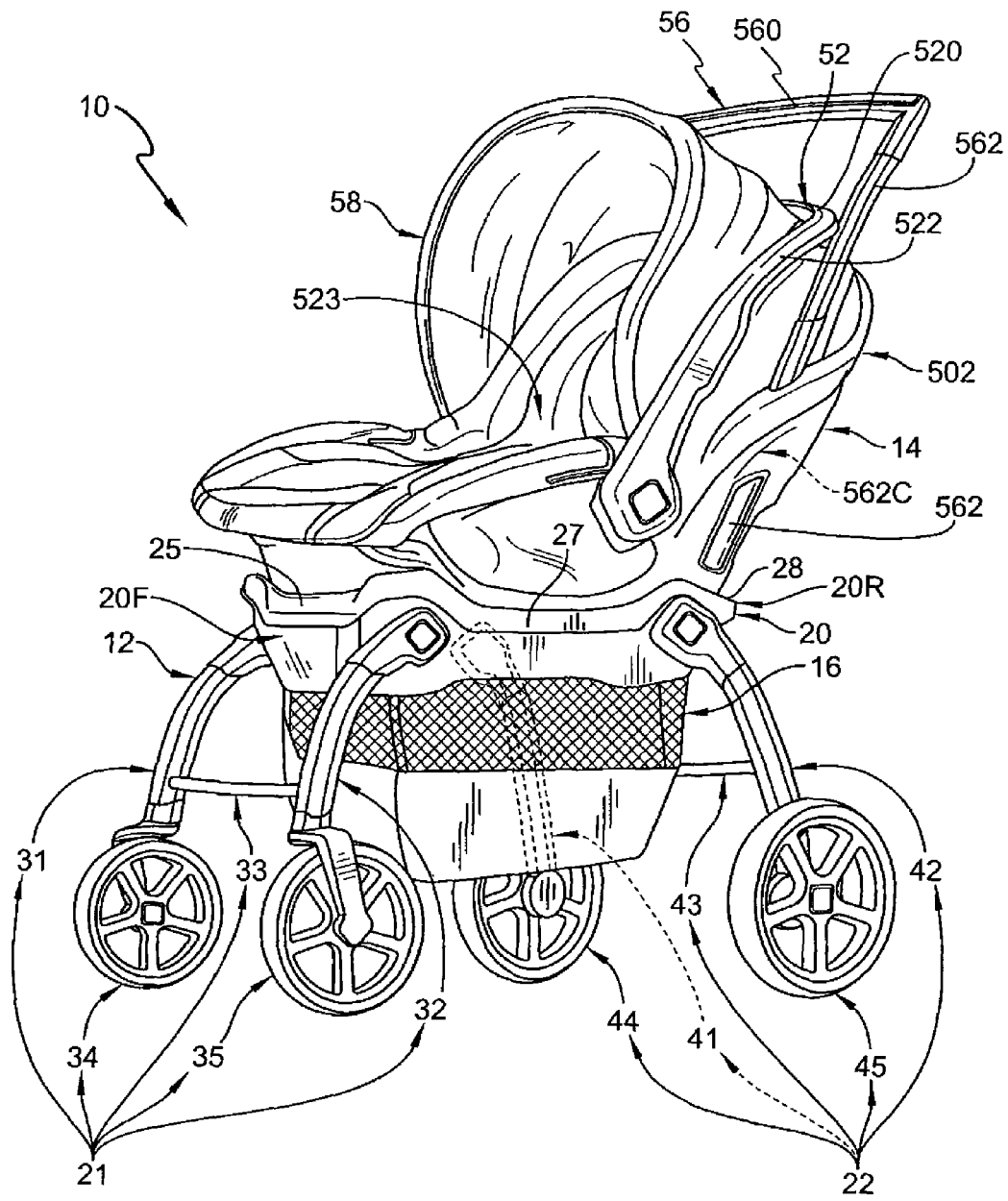
FIG. 1 is a perspective view of a compactible stroller in accordance with the present disclosure showing that the stroller includes a rolling base including an elevated shell-support frame, an infant carrier having a seat shell mounted temporarily to the elevated shell-support frame so that the infant carrier can be moved easily in stroller mode on the rolling base by a caregiver using a retractable stroller push handle mounted on a rear portion of the seat shell, and a basket coupled to the elevated shell-support frame and arranged to lie under the seat shell of the infant carrier.
Figure 2:
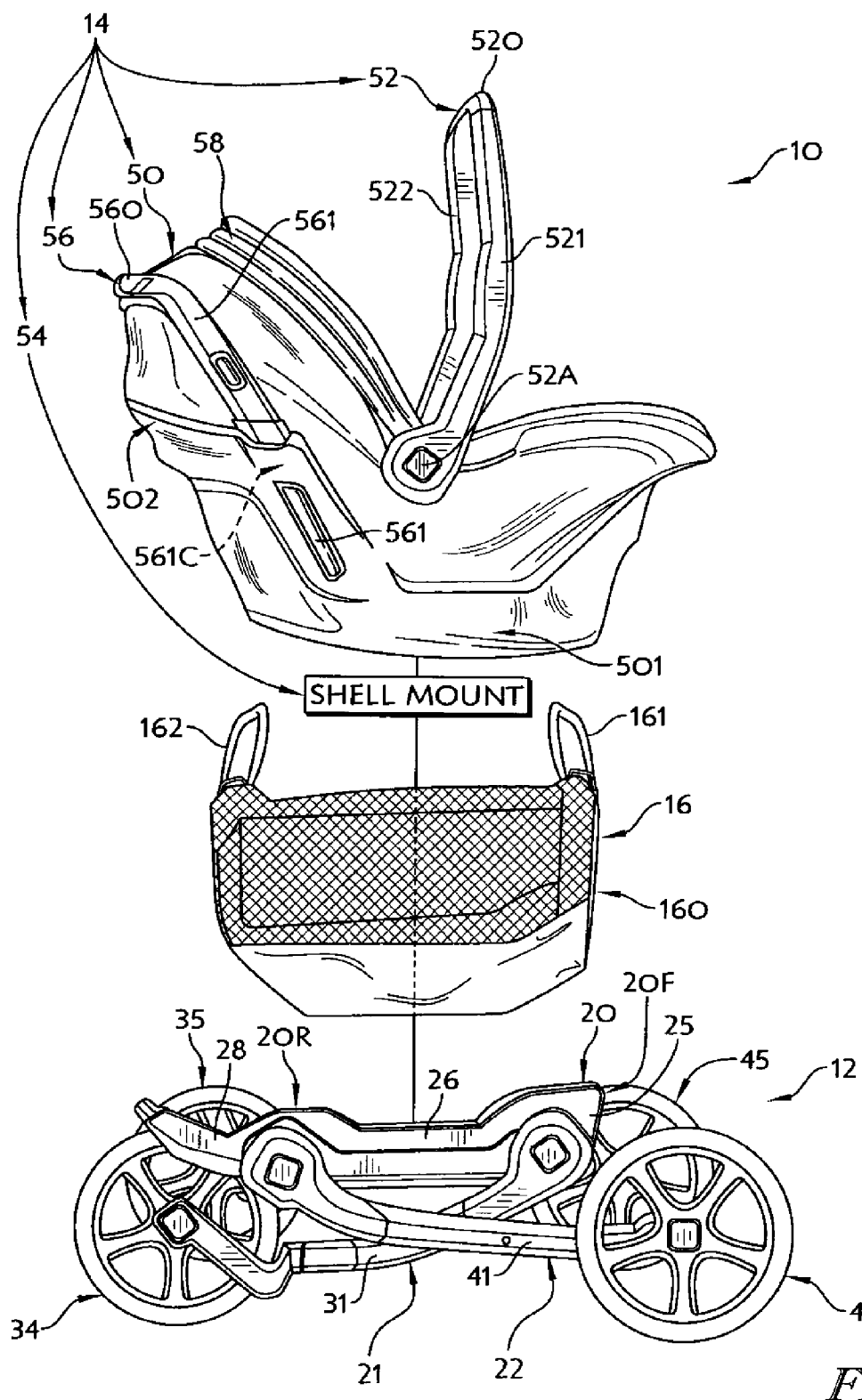
FIG. 2 is an exploded perspective assembly view of the components shown in FIG. 1 that cooperate to provide the compactible stroller and showing that each of the infant carrier and the basket has been separated from the shell-support frame of the rolling base and that the rolling base has been collapsed in a controlled manner by a caregiver after separation of the infant carrier and the basket to assume a compact configuration by pivoting a pivotable front wheel unit relative to the shell-support frame in a counterclockwise direction and by pivoting a pivotable rear wheel unit relative to the shell-support frame in a clockwise direction.
Figure 3:
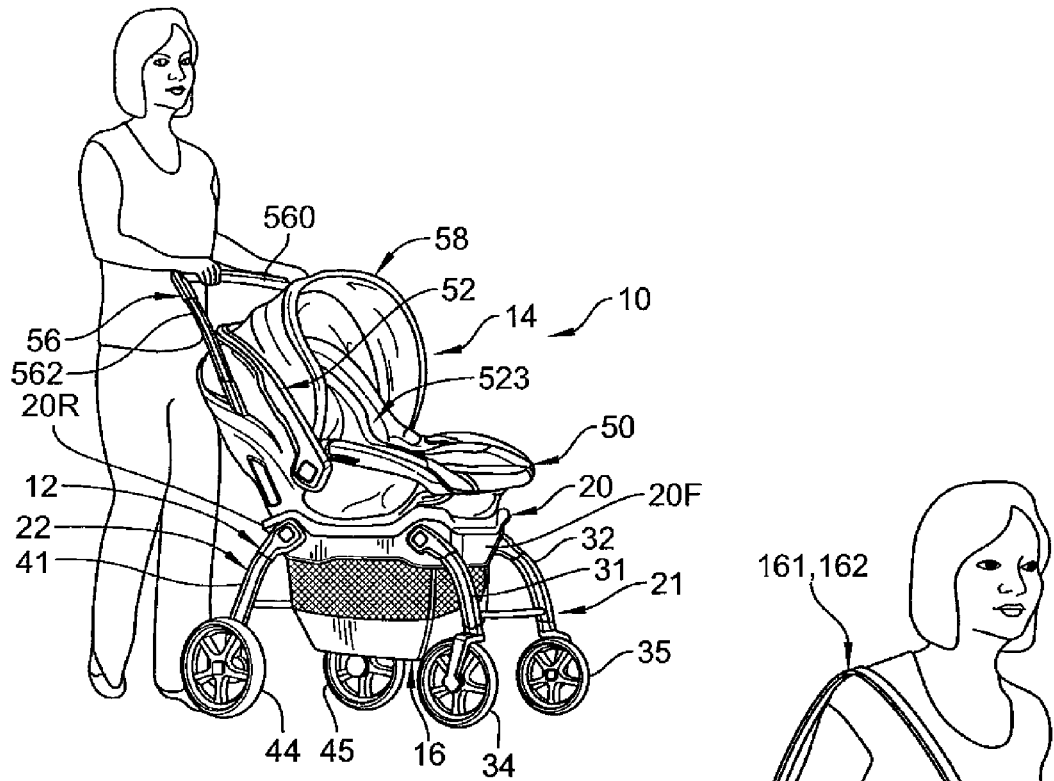
FIG. 3 is a perspective view showing a caregiver gripping a grip portion of an extended stroller push handle included in the infant carrier while the infant carrier is mounted in a stroller mode on the rolling base.

A stroller 10 in accordance with the present disclosure includes a collapsible rolling base 12, an infant carrier 14 adapted to be mounted temporarily on rolling base 12 to assume a stroller mode, and a basket 16 adapted to be mounted on rolling base 12 to lie under infant carrier 14 as suggested in FIGS. 1 and 3. Rolling base 12 is configured to be unfolded to establish an expanded use mode as shown, for example, in FIG. 1 and folded to establish a collapsed storage mode as shown, for example, in FIG. 2. At the option of a caregiver, infant carrier 14 can be separated from rolling base 12 to assume a carrier mode, basket 16 can be separated from rolling base 12 to assume a shoulder bag mode, and rolling base 12 can be folded to assume the collapsed storage mode as suggested in FIGS. 3 and 4.

Figure 8:
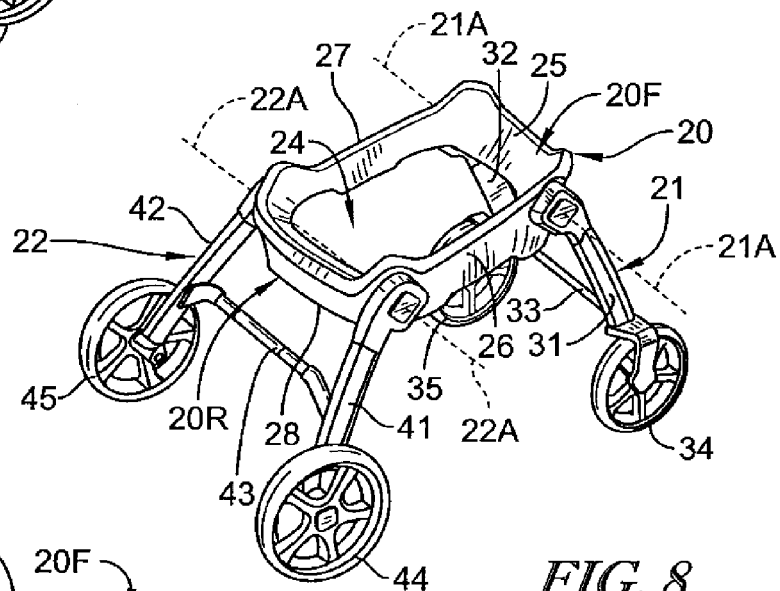
FIG. 8 is a similar view after separation of the basket from the shell-support frame of the rolling base and showing that the rear wheel unit (on the left) is mounted for pivotable movement about a rear pivot axis relative to the elevated shell-support frame and the front wheel unit (on the right) is mounted for pivotable movement about a front pivot axis relative to the elevated shell-support frame.

Rolling base 12 includes an elevated shell-support frame 20, a front wheel unit 21, and a rear wheel unit 22 as shown, for example, in FIG. 8. Shell-support frame 20 is configured to mate with a shell mount 54 included in infant carrier 14 to support a seat shell 50 included in infant carrier 14 as suggested in FIGS. 1, 5, and 6. Each of front and rear wheel units 21, 22 is mounted on shell-support frame 20 for pivotable movement between an extended position associated with the expanded use mode of rolling base 12 and a retracted position associated with the collapsed storage mode of rolling base 12.

Figure 4:
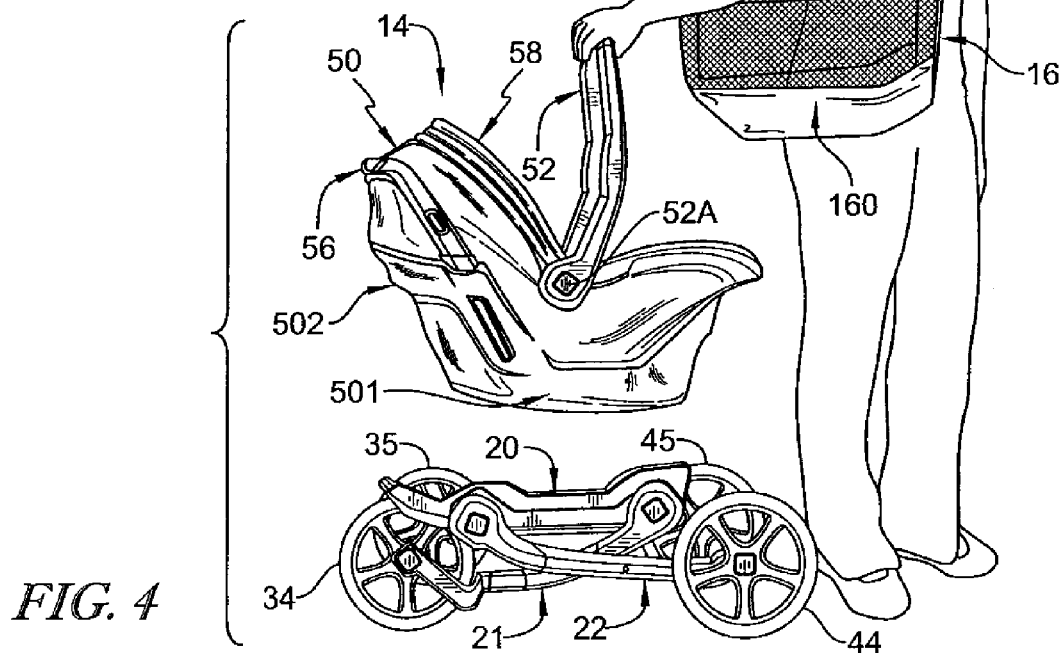
FIG. 4 is a perspective view showing that a caregiver has collapsed the rolling base to assume a compact storage configuration and moved the slidable stroller push handle downwardly to a retracted position on a seat back of the seat shell and that the caregiver is now wearing the separated basket as a shoulder bag and carrying the infant carrier by means of a pivotable carry handle that is coupled to the seat shell and separated from the stroller push handle.
Figure 5:
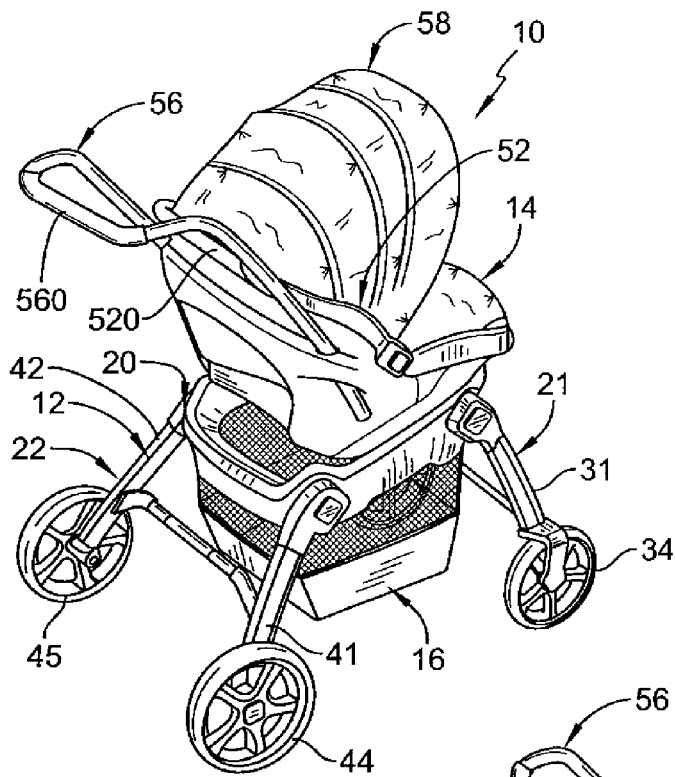
FIG. 5 is a rear perspective view of the compactible stroller of FIG. 1.
Figure 9:
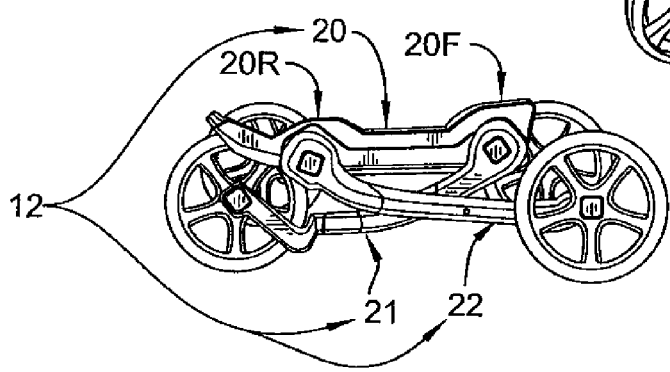
FIG. 9 is a perspective view showing the rolling base in a compact storage configuration after the front wheel unit has been pivoted about the front pivot axis in a clockwise direction and the rear wheel unit has been pivoted about the rear pivot axis in a counterclockwise direction.

Front wheel unit 21 is mounted for pivotable movement about a front pivot axis 21A on a front end 20F of shell-support frame 20 as suggested in FIG. 8 between an extended position shown, for example, in FIGS. 1, 5, and 8 and a retracted position shown, for example, in FIGS. 2, 4, and 9. Rear wheel unit 22 is mounted for pivotable movement about a rear pivot axis 22A on a rear end 20R of shell-support frame 20 as suggested in FIG. 8 between an extended position shown, for example, in FIGS. 1, 5, and 8 and a retracted position shown, for example in FIGS. 2, 4, and 9. Front and rear pivot axes 21A, 22A are arranged to lie in spaced-apart parallel relation to another in an illustrative embodiment as suggested in FIG. 8.

An ultra compact infant car seat stroller 10 is provided in accordance with the present disclosure. Spatial issues relating to travel and use in small cars, apartments, and homes are solved owing in part to provision of a collapsible rolling base 12 adapted to be mated to an infant carrier 14 as disclosed herein.

Elevated shell-support frame 20 of rolling base 12 is rectangle-shaped in an illustrative embodiment and formed to include a central basket-receiving aperture 24 as suggested in FIG. 8. Basket 16 is configured in an illustrative embodiment to mate with shell-support frame 20 in a stroller mode and extend downwardly through central basket-receiving aperture 24 as suggested in FIGS. 5-7. Basket 16 comprises a fabric or other non-rigid material (e.g., molded EVA) and is non-permanently attached to rolling base 12.

Elevated shell-support frame 20 includes a front bar 25 arranged to extend generally along front pivot axis 21A and a rear bar 28 arranged to lie in spaced-apart relation to front bar 25 and to extend generally along rear pivot axis 22A as shown, for example, in FIG. 8. Shell-support frame 20 also includes first and second side bars 26, 27. First side bar 26 is arranged to interconnect companion first ends of each of front and rear bars 25, 28 as suggested in FIG. 8. Second side bar 27 is arranged to lie in spaced-apart relation to first side bar 26 and to interconnect companion second ends of each of front and rear bars 25, 28 as also suggested in FIG. 8. Front, first side, rear, and second side bars 25, 26, 28, and 27 are connected in series to form an endless loop 29 and a boundary of central basket-receiving aperture 24 in an illustrative embodiment as suggested in FIGS. 7 and 8.

Front wheel unit 21 of rolling base 12 includes a first front leg 31, a second front leg 32, and a front stretcher 33 arranged to interconnect first and second front legs 31, 32 as shown, for example, in FIGS. 1 and 8. Front wheel unit 21 also includes a first front wheel 34 mounted for rotation on a lower end of first front leg 31 and a second front wheel 35 mounted for rotation on a lower end of second front leg 32. An upper end of first front leg 31 is mounted on a forward end of first side bar 26 of shell-support frame 20 for pivotable movement about front pivot axis 21A. An upper end of second front leg 32 is mounted on a forward end of second side bar 27 of shell-support frame 20 for pivotable movement about front pivot axis 21A. In an illustrative embodiment, each of first and second front legs 31, 32 are oriented to slope forwardly in a generally positive direction as suggested in FIGS. 1 and 8 to place front wheels 34, 35 generally forward of the front pivot axis 21A when rolling base 12 is unfolded to assume the expanded use mode as suggested in FIGS. 1 and 8.

Rear wheel unit 22 of rolling base 12 includes a first rear leg 41, a second rear leg 42, and a rear stretcher 43 arranged to interconnect first and second rear legs 41, 42 as suggested, for example, in FIGS. 1 and 8. Rear wheel unit 22 also includes a first rear wheel 44 mounted for rotation on a lower end of first rear leg 41 and a second rear wheel 45 mounted for rotation on a lower end of second rear leg 42. An upper end of first rear leg 41 is mounted on a rearward end of first side bar 26 of shell-support frame 20 for pivotable movement about rear pivot axis 22A. An upper end of second rear leg 42 is mounted on a rearward end of second side bar 27 of shell-support frame 20 for pivotable movement about rear pivot axis 22A. In an illustrative embodiment, each of first and second rear legs 41, 42 are oriented to slope rearwardly in a generally negative direction as suggested in FIGS. 1 and 8 to place rear wheels 44, 45 generally rearward of the rear pivot axis 22A when rolling base 12 is unfolded to assume the expanded use mode as suggested in FIGS. 1 and 8.

Infant carrier 14 includes a seat shell 50 configured to receive an infant (not shown) therein, a carry handle 52 coupled to seat shell 50 for pivotable movement about a handle pivot axis 52A, and a shell mount 54 coupled to seat shell 50 and adapted to be coupled to shell-support frame 20 as suggested in FIG. 2. Infant carrier 14 also includes a stroller push handle 56 mounted for movement on seat shell 50 between (1) an extended position in which a grip portion 560 included in push handle 56 is arranged to lie above seat shell 50 to be gripped by a caregiver when infant carrier 14 is mounted in a stroller mode on rolling base 12 to provide stroller 10 as suggested in FIGS. 1 and 3 and (2) a retracted position in which grip portion 560 of stroller push handle 56 is arranged to lie alongside seat shell 50 and away from carry handle 52 when infant carrier 14 has been separated from rolling base 12 as suggested in FIGS. 2 and 4 to assume a carrier mode.

Seat shell 50 includes a seat bottom 501 and a seat back 502 arranged to extend upwardly from a rear portion of seat bottom 501 as suggested in FIG. 2. Infant carrier 14 also includes an expandable canopy 58 coupled to seat back 502 and movable between an opened position shown in FIGS. 1 and 3 and a closed position shown in FIGS. 2 and 4.

Carry handle 52 includes a grip portion 520, a first arm 521, and a second arm 522 as suggested in FIGS. 1 and 2. First arm 521 includes an upper end fixed to a first end of grip portion 520 and a lower end pivotably coupled to a first side of seat shell 50. Second arm 522 includes an upper end fixed to an opposite second end of grip portion 520 and a lower end pivotably coupled to an opposite second side of seat shell 50. Grip portion 520 is arranged to lie above an infant-receiving region 523 formed in seat shell 50 upon movement of carry handle 52 from a retracted storage position shown in FIG. 1 to an extended carry position shown in FIGS. 2 and 4. It is within the scope of the present disclosure to configure carry handle 52 so that it functions as a carry handle and as a stroller push handle.

Shell mount 54 is a seat shell anchor system that is shown diagrammatically in FIG. 2 and that is configured to retain seat shell 50 of infant carrier 14 temporarily in a stationary position on the elevated shell-support frame 20 of rolling base 12 when infant carrier 14 is mounted in stroller mode on rolling base 12 as suggested in FIG. 1. Shell mount 54 can be of any suitable construction and may include shell anchors (not shown) mounted for movement on seat shell 50 between carrier-retaining positions engaging shell-support frame 20 and carrier-releasing positions disengaging shell-support frame 20. Shell mount 54 may also include an anchor controller (not shown) configured to provide means for moving the shell anchors relative to seat shell 50 at the same time with one actuation force so that seat shell 50 is free to be separated from shell-support frame 20 rolling base 12 to assume the carrier mode as suggested in FIG. 4. It is within the scope of this disclosure to provide an anchor controller comprising a movable release handle on seat shell 50 along with cables interconnecting the release handle and the shell anchors and springs biasing the shell anchors toward carrier-retaining positions.

Stroller push handle 56 is arranged to slide up and down on seat back 502 of seat shell 50 between an extended position associated with the stroller mode of infant carrier 14 as shown in FIGS. 1 and 3 and a retracted position associated with the carrier mode of infant carrier 14 as shown in FIGS. 2 and 4. Stroller push handle 56 includes a grip portion 560, a first arm 561, and a second arm 562 as suggested in FIG. 5. First arm 561 includes an upper portion fixed to a first end of grip portion 560 and a lower portion received in a first slide channel 561C provided on a first side of seat back 202. Second arm 562 includes an upper portion fixed to an opposite second end of grip portion 560 and a lower portion received in a second slide channel 562C provided on an opposite second side of seat back 202. Each slide channel 561C, 562C is configured to provide means for slidably receiving the lower portion of one of the arms 561, 562 to support stroller push handle 56 for up-and-down movement relative to seat shell 50 between the extended and retracted positions.

Figure 7:
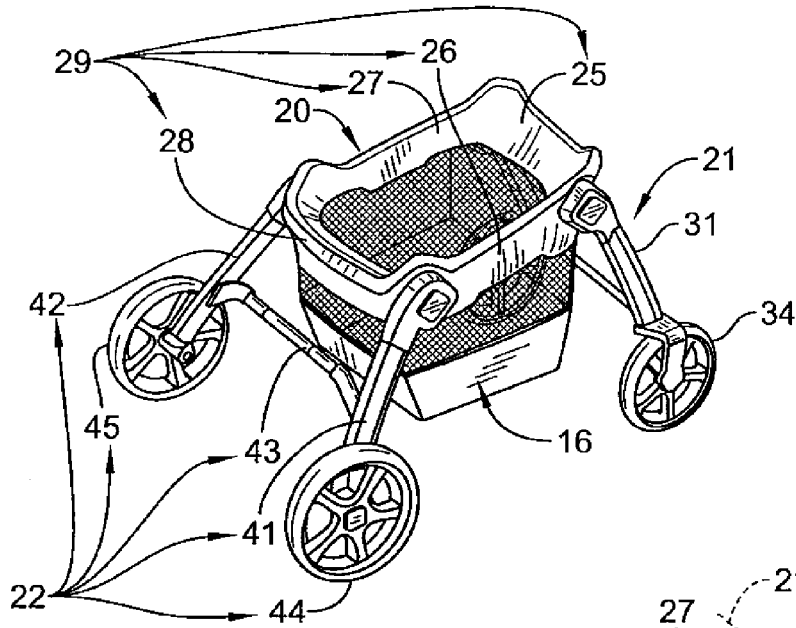
FIG. 7 is a similar view showing the basket still coupled to the shell-support frame in the rolling base after separation of the infant carrier from the shell-support frame.

Basket 16 is configured to function as (1) a storage basket when mated to shell-support frame 20 of rolling base 12 a suggested in FIGS. 1, 3, and 7 and (2) a wearable shoulder bag when separated from shell-support frame 20 of rolling base 12 as suggested in FIG. 4. Basket 16 includes a container 160, a first handle 161 coupled to container 160, and a companion second handle 162 coupled to container 160 and arranged to lie in spaced-apart relation to first handle 161 as suggested in FIG. 2. Any suitable fastening means may be used to mount container 160 of basket 16 to shell-support fame 20 to cause shell-support frame 20 to border or surround a top aperture opening into an interior region formed in container 160 as shown, for example, in FIG. 7. First and second handles 161, 162 can be configured in accordance with the present disclosure to provide such fastening means. Each of first and second handles 161, 162 is adjustable in size so as to be lengthened at the option of a caregiver to facilitate use of basket 16 as a wearable shoulder bag as suggested in FIG. 4. In illustrative embodiments, container 160 is made of a soft and pliable material.

A compact collapsible stroller 10 includes an infant carrier 14 including a seat shell 50 configured to receive an infant (not shown) and a rolling base 12 including a shell-support frame 20 as suggested in FIGS. 1 and 2. Stroller 10 also includes a shell mount 54 shown diagrammatically in FIG. 2 and configured to interconnect seat shell 50 and shell-support frame 20 to support seat shell 50 in a supported position above rolling base 12 for movement therewith in an expanded use mode associated with rolling base 12 as suggested in FIGS. 1 and 3 and to release seat shell 50 from the supported position to permit separation of seat shell 50 from rolling base 12 in a collapsed storage mode associated with rolling base 12 as suggested in FIG. 4.

Rolling base 12 further includes a front wheel unit 21 and a rear wheel unit 22 as shown, for example, in FIGS. 1 and 7. Front wheel unit 21 is mounted on shell-support frame 20 for pivotable movement between a retracted position (illustratively shown in FIG. 2) arranged to lie under shell-support frame 20 in the collapsed storage mode of rolling base 12 and an extended position (illustratively shown in FIG. 1) arranged to extend away from an underside of shell-support frame 20 in the expanded use mode of rolling base 12. Rear wheel unit 22 is mounted on shell-support frame 20 for pivotable movement between a retracted position (illustratively shown in FIG. 2) arranged to lie alongside front wheel unit 21 in the collapsed storage mode of rolling base 12 and an extended position (illustratively shown in FIGS. 1, 3, and 5) arranged to extend away from shell-support frame 20 and from front wheel unit 21 in the expanded use mode of rolling base 12 to cooperate with front wheel unit 21 to elevate shell-support frame 20 above ground underlying rolling base 12 in the expanded use mode of rolling base 12.

Infant carrier 14 further includes a handle 56 in an illustrative embodiment shown in FIG. 1. Handle 56 is mounted on seat shell 50 for extensible movement relative to seat shell 50 between a retracted position suggested in FIG. 2 and an extended position suggested in FIGS. 1, 3, and 5. Handle 56 is configured to provide means for moving a mobile unit including rolling base 12 and seat shell 50 along ground underlying rolling base 12 in the expanded use mode of rolling base 12 after seat shell 50 is coupled to shell mount 54 to support seat shell 50 on rolling base 12 and handle 56 has been moved relative to seat shell 50 to assume the extended position as suggested in FIG. 3.

Each of the front and rear wheel units 21, 22 is mounted on shell-support frame 20 for pivotable movement about a pivot axis extending through shell-support frame 20 between the retracted and extended positions as suggested in the present disclosure. Front and rear wheel units 21, 22 are arranged on shell-support frame 20 to position the pivot axis 21A of front wheel unit 21 in spaced-apart relation to the pivot axis 22A of rear wheel unit 22 as suggested in an illustrative embodiment shown in FIGS. 7-9.

Seat shell 50 includes a seat bottom 501 and a seat back 502 arranged to extend upwardly from the seat bottom 501 as suggested in FIG. 2. Handle 56 includes a laterally extending grip portion 560, an extensible first arm 561 including an upper portion fixed to a first end of grip portion 560 and a lower portion coupled to a first side of seat shell 50, and an extensible second arm 562 including an upper portion fixed to a second end of grip portion 560 and a lower portion coupled to an opposite second side of seat shell 50 as suggested in FIGS. 1-3 and 5. Grip portion 560 is arranged to lie above and in rearwardly spaced-apart relation to seat shell 50 to locate seat bottom 501 between grip portion 560 and front wheel unit 21 to allow grip portion 560 to be gripped by a caregiver in response to movement of handle 56 to the extended position as suggested in FIG. 1.

Front wheel unit 21 includes a first front wheel 34, a first front leg 31 having an upper end mounted for pivotable movement on shell-support frame 20 and a lower end coupled to first front wheel 34 to support first front wheel 34 for rotation about an axis of rotation, a second front wheel 35, and a second front leg 32 having an upper end mounted for pivotable movement on shell-support frame 20 and a lower end coupled to second front wheel 35 to support second front wheel 35 for rotation about an axis of rotation as suggested in FIG. 1. Front wheel unit 21 also includes a front stretcher 33 coupled to first and second front legs 31, 32 as suggested in FIG. 1.

Rear wheel unit 22 includes a first rear wheel 44, a first rear leg 41 having an upper end mounted for pivotable movement on shell-support frame 20 and a lower end coupled to first rear wheel 44 to support first rear wheel 44 for rotation about an axis of rotation, a second rear wheel 45, and a second rear leg 42 having an upper end mounted for pivotable movement on shell-support frame 20 and a lower end coupled to second rear wheel 45 to support second rear wheel 45 for rotation about an axis of rotation as suggested in FIGS. 1 and 5. Rear wheel unit 22 also includes a rear stretcher 43 coupled to first and second rear legs 41, 42 as suggested in FIG. 5.

First and second rear legs 41, 42 are arranged to lie in laterally spaced-apart relation to one another to locate first and second front legs 31, 32 in a space provided under shell-support frame 20 and between first and second rear legs 41, 42 in the collapsed storage mode of rolling base 12 in an illustrative embodiment as suggested in FIGS. 2, 8, and 9. Seat bottom 50 is positioned to lie between first and second front wheels 34, 35 and grip portion 560 of handle 56 when rolling base 12 is moved to assume the expanded use mode and handle 56 is moved to the extended position as suggested in an illustrative embodiment shown in FIGS. 1 and 5.

Front wheel unit 21 is mounted in illustrative embodiments on a front end 20F of shell-support frame 20 for pivotable movement about a front pivot axis 21A between a retracted position arranged to lie under shell-support frame 20 in the collapsed storage mode of rolling base 12 and an extended position arranged to extend away from an underside of shell-support frame 20 to elevate front end 20F of shell-support frame 20 above ground underlying rolling base 12 in the expanded use mode of rolling base 12 as suggested in FIGS. 8 and 9. Rear wheel mount 22 is mounted in illustrative embodiments on a rear end 20R of shell-support frame 20 for pivotable movement about a rear pivot axis 22A between a retracted position arranged to lie under shell-support frame 20 in the collapsed storage mode of rolling base 12 and an extended position arranged to extend away from the underside of shell-support frame 20 to elevate rear end 20R of shell-support frame 20 above ground underlying rolling base 12 in the expanded use mode of rolling base 12 as suggested in FIGS. 8 and 9.

First front wheel 34 included in front wheel unit 21 is arranged to lie in close proximity to rear end 20R of shell-support frame 20 in the collapsed storage mode of rolling base 12 as suggested in the illustrative embodiment shown in FIG. 2. First rear wheel 44 included in rear wheel unit 22 is arranged to lie in close proximity to front end 20F of shell-support frame 20 in the collapsed storage mode of rolling base 12 as suggested in the illustrative embodiment shown in FIG. 2. First front leg 31 and first rear leg 41 are arranged to lie in side-by-side criss-crossed relation to one another in the collapsed storage mode of rolling base 12 and in spaced-apart splayed relation to one another to diverge in a direction extending away from shell-support frame 20 in the expanded use mode of rolling base 12 as suggested in the illustrative embodiment shown in FIG. 2. In the collapsed storage mode of rolling base 12, first and second rear legs 41, 42 are arranged to lie in laterally spaced-apart relation to one another to locate first and second front legs 31, 32 in a space provided under shell-support frame 20 and between first and second rear legs 41, 42 as suggested in the illustrative embodiment shown in FIG. 2.

Each of the first front and rear legs 31, 41 has a curved shape in illustrative embodiments as suggested in FIGS. 1 and 3. A concave edge of first front leg 31 is arranged to extend between the upper and lower ends of first front leg 31 and face away from ground underlying rolling base 12 in the collapsed storage mode of rolling base 12 and toward ground underlying rolling base 12 in the expanded use mode of rolling base 12 as suggested in FIG. 2.

Each of the second front and rear legs 32, 42 has a curved shape in illustrative embodiments as suggested in FIG. 1. A concave edge of second front leg 32 is arranged to extend between the upper and lower ends of second front leg 32 and face away from ground underlying rolling base 12 in the collapsed storage mode of rolling base 12 and toward ground underlying rolling base 12 in the expanded use mode of rolling base 12 as suggested in FIG. 2.

Shell-support frame 20 includes a front bar 25 arranged to extend generally along front pivot axis 21A, a rear bar 28 arranged to extend generally along rear pivot axis 22A, a first side bar 26 arranged to interconnect companion first ends of each of front and rear bars 25, 28, and a second side bar 27 arranged to interconnect companion second ends of each of first and second rear bars 25, 28 as suggested in the illustrative embodiment shown in FIGS. 8 and 9. The upper end of first front leg 31 is mounted for pivotable movement about front pivot axis 21A on a forward end of first side bar 26. The upper end of second front leg 32 is mounted for pivotable movement about front pivot axis 21A on a forward end of second side bar 27. The upper end of first rear leg 41 is mounted for pivotable movement about rear pivot axis 22A on an opposite rearward end of first side bar 26. The upper end of second rear leg 42 is mounted for pivotable movement about rear pivot axis 22A on an opposite rearward end of second side bar 27.

In illustrative embodiments, the front, first side, rear, and second side bars 25, 26, 28, 27 are connected in series to form an endless loop 29 and a boundary of a central basket-receiving aperture 24 as suggested in FIG. 8. Stroller 10 further includes a basket 16 configured to mate with shell-support frame 20 in the stroller mode of basket 16 and extend downwardly through central basket-receiving aperture 24 toward ground underlying rolling base 12 as suggested in FIG. 7.

Basket 16 comprises a pliable material and is attached non-permanently to rolling base 12.

Stroller 10 further includes a stroller push handle 56 that is mounted on seat shell 50 for sliding movement relative to seat shell 50 between a retracted storage position and an extended use position as suggested in FIGS. 3 and 4. Stroller push handle 56 is configured to provide means for moving a mobile unit including rolling base 12 and seat shell 50 along ground underlying rolling base 12 in the expanded use mode of rolling base 12 after seat shell 50 is coupled to shell mount 54 to support seat shell 50 on rolling base 12 and stroller push handle 56 has been moved relative to seat shell 50 to assume the extended use position. Stroller push handle 56 is mounted for sliding movement on an exterior portion of seat back 502. In illustrative embodiments, stroller 10 further includes a carry handle 52 coupled to seat shell 50 for pivotable movement about a handle pivot axis 52A and to cooperate with seat shell 50 to form a mobile infant carrier 14 that is separable from shell mount 54 on rolling base 12 at least in the collapsed storage mode of rolling base 12 as suggested in FIGS. 3 and 4.

Stroller push handle 56 includes a laterally extending grip portion 560, a first arm 561 including an upper portion fixed to a first end of grip portion 560 and a lower portion received in a first slide channel 561C provided on a first side of seat shell 50, and a second arm 562 including an upper portion fixed to a second end of grip portion 560 and a lower portion received in a second slide channel 562C provided on a second side of seat shell 50 as suggested in FIGS. 1, 3, and 5. Grip portion 560 is arranged to lie above and in spaced-apart relation to seat shell 50 to be gripped by a caregiver in response to movement of stroller push handle 56 to the extended position and to lie alongside seat shell 50 and away from carry handle 52 in response to movement of stroller push handle 56 to the retracted position.

Figure 6:
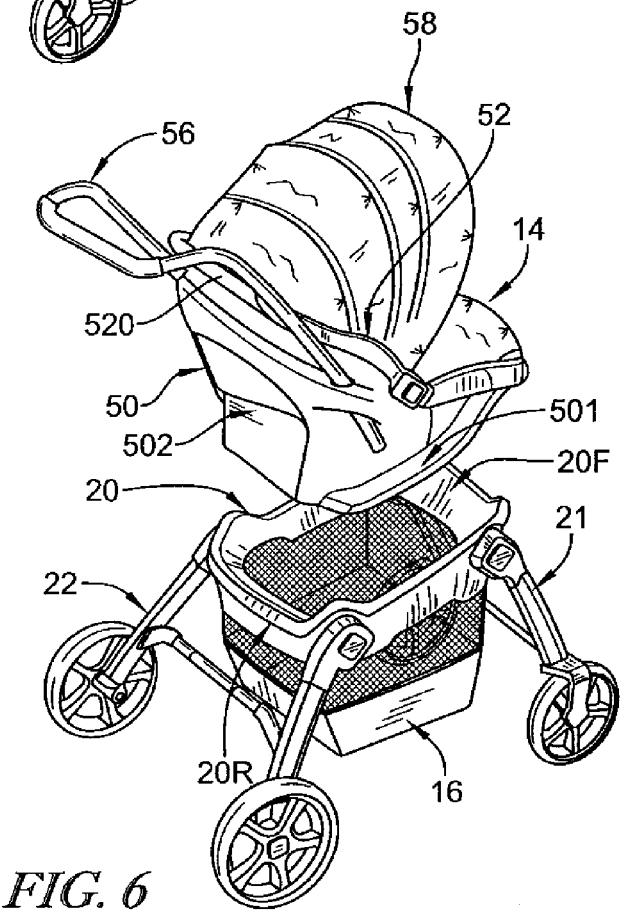
FIG. 6 is a similar view showing separation of the infant carrier from the underlying rolling base.

Basket 16 is configured to be mated to shell-support frame 20 to form a storage basket under seat shell 50 in the stroller mode of rolling base 12 when seat shell 50 is supported on shell mount 54 above rolling base 12 as suggested in FIGS. 2, 5, and 6 and is configured to provide a wearable shoulder bag when separated from shell-support frame 20 as suggested in FIG. 4. Basket 16 includes a container 160 formed to include an article-storage space, a first handle 161 coupled to the container, and a second handle 162 coupled to container 160 and arranged to lie in spaced-apart relation to first handle 161. First and second handles 161, 162 are configured to provide shoulder-strap means for carrying container 160 on a shoulder of a person as a wearable shoulder bag after separation of basket 16 from shell-support frame 20. Container is arranged to underlie seat shell 50 when seat shell 50 is supported on shell mount 54 as suggested in FIGS. 5 and 6.

First and second handles 161, 162 cooperate to provide fastening means for mounting container 160 of basket 16 of shell-support frame 20 as suggested in FIGS. 5 and 6. Each of the first and second handles 161, 162 is adjustable in size so as to be lengthened at the option of a caregiver to facilitate use of basket 16 as a wearable shoulder bag.

The invention claimed is:

1. A compact collapsible stroller comprising
a seat shell configured to receive an infant,
a rolling base including a shell-support frame, and
a shell mount configured to interconnect the seat shell and the rolling base to support the seat shell in a supported position above the rolling base for movement therewith in an expanded use mode associated with the rolling base and to release the seat shell from the supported position to permit separation of the seat shell from the rolling base in a collapsed storage mode associated with the rolling base, wherein the rolling base further includes a front wheel unit mounted on a front end of the shell-support frame for pivotable movement about a front pivot axis between a retracted position arranged to lie under the shell-support frame in the collapsed storage mode of the rolling base and an extended position arranged to extend away from an underside of the shell-support frame to elevate the front end of the shell-support frame above ground underlying the rolling base in the expanded use mode of the rolling base and a rear wheel unit mounted on a rear end of the shell-support frame for pivotable movement about a rear pivot axis between a retracted position arranged to lie under the shell-support frame in the collapsed storage mode of the rolling base and an extended position arranged to extend away from the underside of the shell-support frame to elevate the rear end of the shell-support frame above ground underlying the rolling base in the expanded use mode of the rolling base, and wherein a first front wheel included in the front wheel unit moves rearwardly to lie in close proximity to the rear end of shell-support frame in the collapsed storage mode of the rolling base and a first rear wheel included in the rear wheel unit is arranged to move forward to lie in close proximity to the front end of the shell-support frame in the collapsed storage mode of the rolling base wherein the shell-support frame comprises a central basket-receiving aperture and the stroller comprises a basket configured to mate with the shell-support frame in a stroller mode with the basket extending downwardly through the central basket-receiving aperture toward ground underlying the rolling base.

2. The stroller of claim 1, wherein the front wheel unit further includes a first front leg having an upper end mounted on the shell-support frame for rotation about the front pivot axis and a lower end coupled to the first front wheel to support the first front wheel for rotation about an axis of rotation, the rear wheel unit further includes a first rear leg having an upper end mounted on the shell-support frame for rotation about the rear pivot axis and a lower end coupled to the first rear wheel to support the first rear wheel for rotation about an axis of rotation, and the first front leg and first rear leg are arranged to lie in side-by-side criss-crossed relation to one another in the collapsed storage mode of the rolling base and in spaced-apart splayed relation to one another to diverge in a direction extending away from the shell-support frame in the expanded use mode of the rolling base.

3. The stroller of claim 2, wherein each of the first front and rear legs has a curved shape, and a concave edge of the first front leg is arranged to extend between the upper and lower ends of the first front leg and face away from ground underlying the rolling base in the collapsed storage mode of the rolling base and toward the ground underlying the rolling base in the expanded use mode of the rolling base.

4. The stroller of claim 2, wherein the front wheel unit further includes a second front wheel and a second front leg having an upper end mounted on the shell-support frame for rotation about the front pivot axis and a lower end coupled to the second front wheel to support the first second wheel for rotation about an axis of rotation, the rear wheel unit further includes a second rear wheel and a second rear leg having an upper end mounted on the shell-support frame for rotation about the rear pivot axis and a lower end coupled to the second rear wheel to support the second rear wheel for rotation about an axis of rotation, and the second front leg and second rear leg are arranged to lie in side-by-side criss-crossed relation to one another in the collapsed storage mode of the rolling base and in spaced-apart splayed relation to one another to diverge in a direction extending away from the shell-support frame in the expanded use mode of the rolling base.

5. The stroller of claim 4, wherein in the collapsed storage mode of the rolling base the first and second rear legs are arranged to lie in laterally spaced-apart relation to one another to locate the first and second front legs in a space provided under the shell-support frame and between the first and second rear legs.

6. The stroller of claim 4, wherein each of the second front and rear legs has a curved shape, and a concave edge of the second front leg is arranged to extend between the upper and lower ends of the second front leg and face away from ground underlying the rolling base in the collapsed storage mode of the rolling base and toward the ground underlying the rolling base in the expanded use mode of the rolling base.

7. The stroller of claim 2, wherein the shell-support frame includes a front bar arranged to extend generally along the front pivot axis, a rear bar arranged to extend generally along the rear pivot axis, a first side bar arranged to interconnect companion first ends of each of the front and rear bars, and a second side bar arranged to interconnect companion second ends of each of the front and rear bars.

8. The stroller of claim 7, wherein the upper end of the first front leg is mounted for pivotable movement about the front pivot axis on a forward end of the first side bar, the upper end of the second front leg is mounted for pivotable movement about the front pivot axis on a forward end of the second side bar, the upper end of the first rear leg is mounted for pivotable movement about the rear pivot axis on an opposite rearward end of the first side bar, and the upper end of the second rear leg is mounted for pivotable movement about the rear pivot axis on an opposite rearward end of the second side bar.

9. The stroller of claim 1, wherein the stroller further comprises a stroller push handle that is mounted on the seat shell for sliding movement relative to the seat shell between a retracted storage position and an extended use position to provide means for moving a mobile unit including the rolling base and the seat shell along ground underlying the rolling base in the expanded use mode of the rolling base after the seat shell is coupled to the shell mount to support the seat shell on the rolling base and the stroller push handle has been moved relative to the seat shell to assume the extended use position.

10. The stroller of claim 9, wherein the seat shell includes a seat bottom and a seat back arranged to extend upwardly from the seat bottom and the stroller push handle is mounted for sliding movement on an exterior portion of the seat back.

11. The stroller of claim 9, wherein the stroller further includes a carry handle mounted separately from the push handle, the carry handle coupled to the seat shell for pivotable movement about a handle pivot axis and to cooperate with the seat shell to form a mobile infant carrier that is separable from the rolling base at least in the collapsed storage mode of the rolling base.

12. The stroller of claim 9, wherein the stroller push handle includes a laterally extending grip portion, a first arm including an upper portion fixed to a first end of the grip portion and a lower portion received in a first slide channel provided on a first side of the seat shell, and a second arm including an upper portion fixed to a second end of the grip portion and a lower portion received in a second slide channel provided on a second side of the seat shell.

13. The stroller of claim 12, wherein the grip portion is arranged to lie above and in spaced-apart relation to the seat shell to be gripped by a caregiver in response to movement of the stroller push handle to the extended position and to lie alongside the seat shell and away from the carry handle in response to movement of the stroller push handle to the retracted position.

14. A compact collapsible stroller comprising
a seat shell configured to receive an infant,
a rolling base including a shell-support frame, and
a shell mount configured to interconnect the seat shell and the rolling base to support the seat shell in a supported position above the rolling base for movement therewith in an expanded use mode associated with the rolling base and to release the seat shell from the supported position to permit separation of the seat shell from the rolling base in a collapsed storage mode associated with the rolling base, wherein the rolling base further includes a front wheel unit mounted on a front end of the shell-support frame for pivotable movement about a front pivot axis between a retracted position arranged to lie under the shell-support frame in the collapsed storage mode of the rolling base and an extended position arranged to extend away from an underside of the shell-support frame to elevate the front end of the shell-support frame above ground underlying the rolling base in the expanded use mode of the rolling base and a rear wheel unit mounted on a rear end of the shell-support frame for pivotable movement about a rear pivot axis between a retracted position arranged to lie under the shell-support frame in the collapsed storage mode of the rolling base and an extended position arranged to extend away from the underside of the shell-support frame to elevate the rear end of the shell-support frame above ground underlying the rolling base in the expanded use mode of the rolling base, and wherein a first front wheel included in the front wheel unit moves rearwardly to lie in close proximity to the rear end of shell-support frame in the collapsed storage mode of the rolling base and a first rear wheel included in the rear wheel unit is arranged to move forward to lie in close proximity to the front end of the shell-support frame in the collapsed storage mode of the rolling base,
wherein the front wheel unit further includes a first front leg having an upper end mounted on the shell-support frame for rotation about the front pivot axis and a lower end coupled to the first front wheel to support the first front wheel for rotation about an axis of rotation, the rear wheel unit further includes a first rear leg having an upper end mounted on the shell-support frame for rotation about the rear pivot axis and a lower end coupled to the first rear wheel to support the first rear wheel for rotation about an axis of rotation, and the first front leg and first rear leg are arranged to lie in side-by-side criss-crossed relation to one another in the collapsed storage mode of the rolling base and in spaced-apart splayed relation to one another to diverge in a direction extending away from the shell-support frame in the expanded use mode of the rolling base,
wherein the shell-support frame includes a front bar arranged to extend generally along the front pivot axis, a rear bar arranged to extend generally along the rear pivot axis, a first side bar arranged to interconnect companion first ends of each of the front and rear bars, and a second side bar arranged to interconnect companion second ends of each of the front and rear bars, and
wherein the front, first side, rear, and second side bars are connected in series to form an endless loop and a boundary of a central basket-receiving aperture and the stroller further comprises a basket configured to mate with the shell-support frame in a stroller mode of the basket and extend downwardly through the central basket-receiving aperture toward ground underlying the rolling base.

15. The stroller of claim 14, wherein the basket comprises a pliable material and is attached non-permanently to the rolling base.

16. The stroller of claim 14, wherein the basket includes a container formed to include an article-storage space and a first handle coupled to the container and configured to provide shoulder-strap means for carrying the container on a shoulder of a person as a wearable shoulder bag after separation of the basket from the shell-support frame.

17. A compact collapsible stroller comprising
a seat shell configured to receive an infant,
a rolling base including a shell-support frame, and
a shell mount configured to interconnect the seat shell and the rolling base to support the seat shell in a supported position above the rolling base for movement therewith in an expanded use mode associated with the rolling base and to release the seat shell from the supported position to permit separation of the seat shell from the rolling base in a collapsed storage mode associated with the rolling base, wherein the rolling base further includes a front wheel unit mounted on a front end of the shell-support frame for pivotable movement about a front pivot axis between a retracted position arranged to lie under the shell-support frame in the collapsed storage mode of the rolling base and an extended position arranged to extend away from an underside of the shell-support frame to elevate the front end of the shell-support frame above ground underlying the rolling base in the expanded use mode of the rolling base and a rear wheel unit mounted on a rear end of the shell-support frame for pivotable movement about a rear pivot axis between a retracted position arranged to lie under the shell-support frame in the collapsed storage mode of the rolling base and an extended position arranged to extend away from the underside of the shell-support frame to elevate the rear end of the shell-support frame above ground underlying the rolling base in the expanded use mode of the rolling base, and wherein a first front wheel included in the front wheel unit moves rearwardly to lie in close proximity to the rear end of shell-support frame in the collapsed storage mode of the rolling base and a first rear wheel included in the rear wheel unit is arranged to move forward to lie in close proximity to the front end of the shell-support frame in the collapsed storage mode of the rolling base, and
wherein the stroller further comprises a basket that is configured to be mated to the shell-support frame to form a storage basket under the seat shell in the expanded use mode of the rolling base when the seat shell is supported on the shell mount above the rolling base and that is configured to provide a wearable shoulder bag when separated from the shell-support frame.

18. The stroller of claim 17, wherein the basket includes a container formed to include an article-storage space and a first handle coupled to the container and configured to provide shoulder-strap means for carrying the container on a shoulder of a person as a wearable shoulder bag after separation of the basket from the shell-support frame.

19. The stroller of claim 17, wherein the basket includes a container, a first handle coupled to the container, and a second handle coupled to the container and arranged to lie in spaced-apart relation to the first handle, and the container is arranged to underlie the seat shell when the seat shell is supported on the shell mount.

20. The stroller of claim 19, wherein the first and second handle cooperate to provide fastening means for mounting the container of the basket to the shell-support frame.

21. The stroller of claim 20, wherein each of the first and second handles is adjustable in size so as to be lengthened at the option of a caregiver to facilitate use of the basket as a wearable shoulder bag.

\* \* \* \* \*